United States Patent [19]

Sawahashi et al.

[11] Patent Number: 5,590,409
[45] Date of Patent: Dec. 31, 1996

[54] TRANSMISSION POWER CONTROL METHOD AND A TRANSMISSION POWER CONTROL APPARATUS

[75] Inventors: Mamoru Sawahashi, Yokosuka; Fumiyuki Adachi, Yokohama, both of Japan

[73] Assignee: NTT Mobile Communications Network Inc., Tokyo, Japan

[21] Appl. No.: 439,463

[22] Filed: May 11, 1995

[30] Foreign Application Priority Data

May 12, 1994 [JP] Japan .................................. 6-098815
Apr. 3, 1995 [JP] Japan .................................. 7-077936

[51] Int. Cl.⁶ .................................................. H04B 1/00
[52] U.S. Cl. ...................... 455/69; 455/54.1; 455/56.1; 455/67.1; 455/88; 370/342; 375/200
[58] Field of Search ........................... 455/69, 70, 67.1, 455/38.3, 123, 33.1, 54.1, 56.1, 88, 67.3, 63, 68; 370/18; 375/200

[56] References Cited

U.S. PATENT DOCUMENTS

| | | | |
|---|---|---|---|
| 4,811,421 | 3/1989 | Havel et al. | 455/69 |
| 5,056,109 | 10/1991 | Gilhousen et al. | 375/1 |
| 5,257,283 | 10/1993 | Gilhousen et al. | 375/1 |
| 5,265,119 | 11/1993 | Gilhousen et al. | 375/1 |
| 5,267,262 | 11/1993 | Wheatley, III et al. | 375/1 |
| 5,301,364 | 4/1994 | Arens et al. | 455/69 |
| 5,333,175 | 7/1994 | Ariyavisitakul et al. | 379/58 |
| 5,345,598 | 9/1994 | Dent | 455/54.1 |
| 5,430,889 | 7/1995 | Hulbert et al. | 455/33.1 |
| 5,455,967 | 10/1995 | Amezawa et al. | 455/69 |
| 5,457,813 | 10/1995 | Poutanen | 455/70 |

*Primary Examiner*—Reinhard J. Eisenzopf
*Assistant Examiner*—Lee Nguyen
*Attorney, Agent, or Firm*—Rogers & Wells

[57] ABSTRACT

A transmission power control method of a mobile station in a CDMA (Code Division Multiple Access) system which primarily controls transmission power of the mobile station by using a closed loop control which enables high accuracy power control. When the received power at the base station of a signal from the mobile station suddenly increases owing to the state of buildings surrounding the mobile station, the transmission power of the mobile station must be quickly reduced to prevent the interference to other mobile stations. The mobile station measures an average value of the received power per transmission power control period of a desired signal from the base station, and detects the difference $\Delta RSSI$ between the current average value and that of one of the previous transmission power control periods. If $\Delta RSSI$ exceeds a reference power difference $\Delta P_{th}$, transmission power $P_T$ corresponding to $\Delta RSSI$ is set by using an open loop transmission power control to quickly reduce the transmission power of the mobile station. If $\Delta RSSI$ is lower than $\Delta P_{th}$, the transmission power $P_T$ is determined in accordance with the transmission power control bit sent from the base station.

4 Claims, 8 Drawing Sheets

PRIOR ART
FIG. 1

PRIOR ART

TRANSMISSION POWER CONTROL METHOD AND A TRANSMISSION POWER CONTROL APPARATUS

BACKGROUND OF THE INVENTION

1. Field of the Invention

The present invention relates to a transmission power control method and a transmission power control apparatus using the same, and more particularly to a transmission power control method of a mobile station in a CDMA (Code Division Multiple Access) system which performs multiple access using a spread spectrum technique in mobile communications, and a transmission power control apparatus using this method.

2. Description of Related Art

As is well-known, a CDMA system falls into two classes: a direct sequence (DS) system which spreads a conventionally modulated signal by using a high rate spreading code; and a frequency hopping (FH) system which resolves a symbol into elements called chips, and translates each chip into signals of different center frequencies at a high rate. Since the FH system is difficult to implement in the state of the art, the DS system is usually employed. Spread-spectrum radio systems differ from conventional communication systems for satellite data networks such as SCPC/FDMA (Single Channel Per Carrier/Frequency Division Multiple Access) systems, or TDMA (Time Division Multiple Access) systems in that the spread-spectrum radio systems transmit, at a transmitter side, a signal after modulating it by a common modulation, and then, performing a secondary modulation using a spreading code to widen its signal bandwidth. At a receiver side, on the other hand, the wideband received signal is despread to restore the narrow band signal, followed by a conventional demodulation processing. The despreading is performed by detecting correlation between the spread-spectrum sequence of the received signal and a spreading code sequence which is generated at the receiving station, and peculiar to the channel. The capacity in terms of the number of subscribers in a cell is determined by an SIR (Signal-to-Interference Ratio) needed to achieve a required error rate because a CDMA system uses the same frequency band for the subscribers.

Applying the CDMA system to the mobile communications presents a problem in that received signal levels at a base station from respective mobile stations vary significantly depending on the locations of the mobile stations, and this arises a "near-far problem", in which a large power signal masks a small power signal, thereby reducing the number of mobile stations communicatable at the same time. In other words, a communication quality of a channel in the CDMA system is degraded by signals from other communicators because the same frequency band is shared by a plurality of communicators and the signals from the other communicators become an interference.

Figure 1:
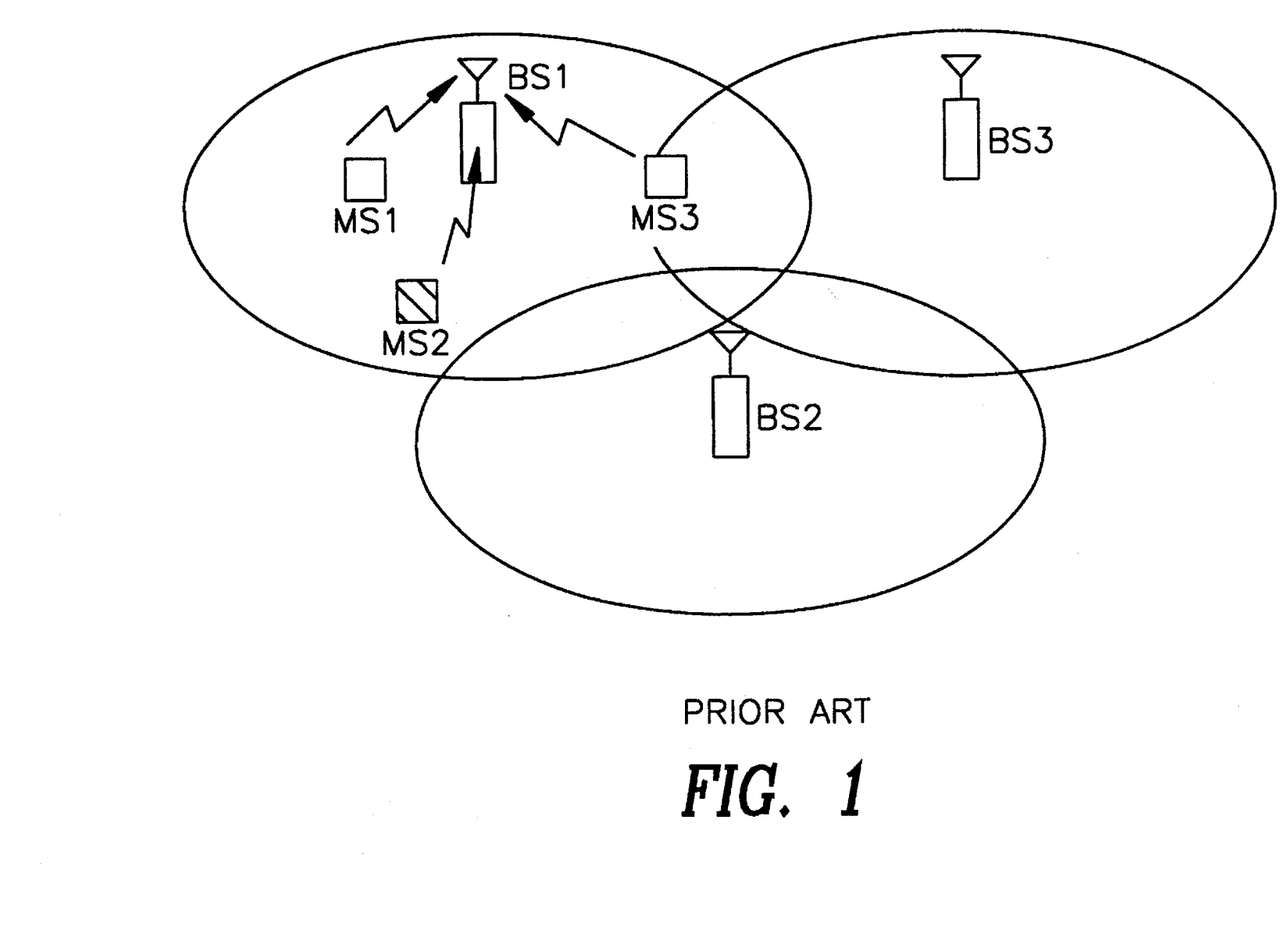
FIG. 1 is a diagram illustrating interference from other mobile stations to a reverse channel in a conventional system.

FIG. 1 illustrates an interference state in a reverse channel (from mobile station to base station) due to other mobile stations. When a mobile station MS1 closer to a base station communicates with the base station BS1 simultaneously with faraway mobile stations MS2 and MS3, the received power of the base station BS1 from the near mobile station MS1 will be greater than that from the faraway mobile stations MS2 and MS3. As a result, the communications of the faraway mobile stations MS2 and MS3 with the base station BS1 will be degraded owing to the interference from the near mobile station MS1.

To overcome such a near-far problem, transmission power control has been introduced. The transmission power control regulates received power at a receiving station, or the SIR determined by the received power, such that the received power or the SIR becomes constant regardless of the locations of mobile stations, thereby achieving uniform communication quality in a service area. Thus, the signal power from the other communicators becomes the interference, and hence, the transmission power control is essential to prevent the signal power of the other communicators from growing much larger than the transmission power of the intended channel.

In particular, with regard to a reverse channel, each mobile station must control its transmission power such that the received power thereof at a base station becomes constant. In a CDMA system, in which the interference power is considered as white noise, the transmission power error is the most important factor in determining the capacity in terms of the number of subscribers in a cell. For example, a 1 dB transmission power error will reduce the capacity in terms of the number of the subscribers by about 30%. Since an FDD (Frequency Division Duplex) system is generally employed to achieve two way communications, a reverse channel and a forward channel (from base station to mobile station) are frequency divided, that is, transmitted carrier frequency and a received carrier frequency differ from each other. Thus, a closed loop transmission power control is generally used in the FDD system.

Figure 2:
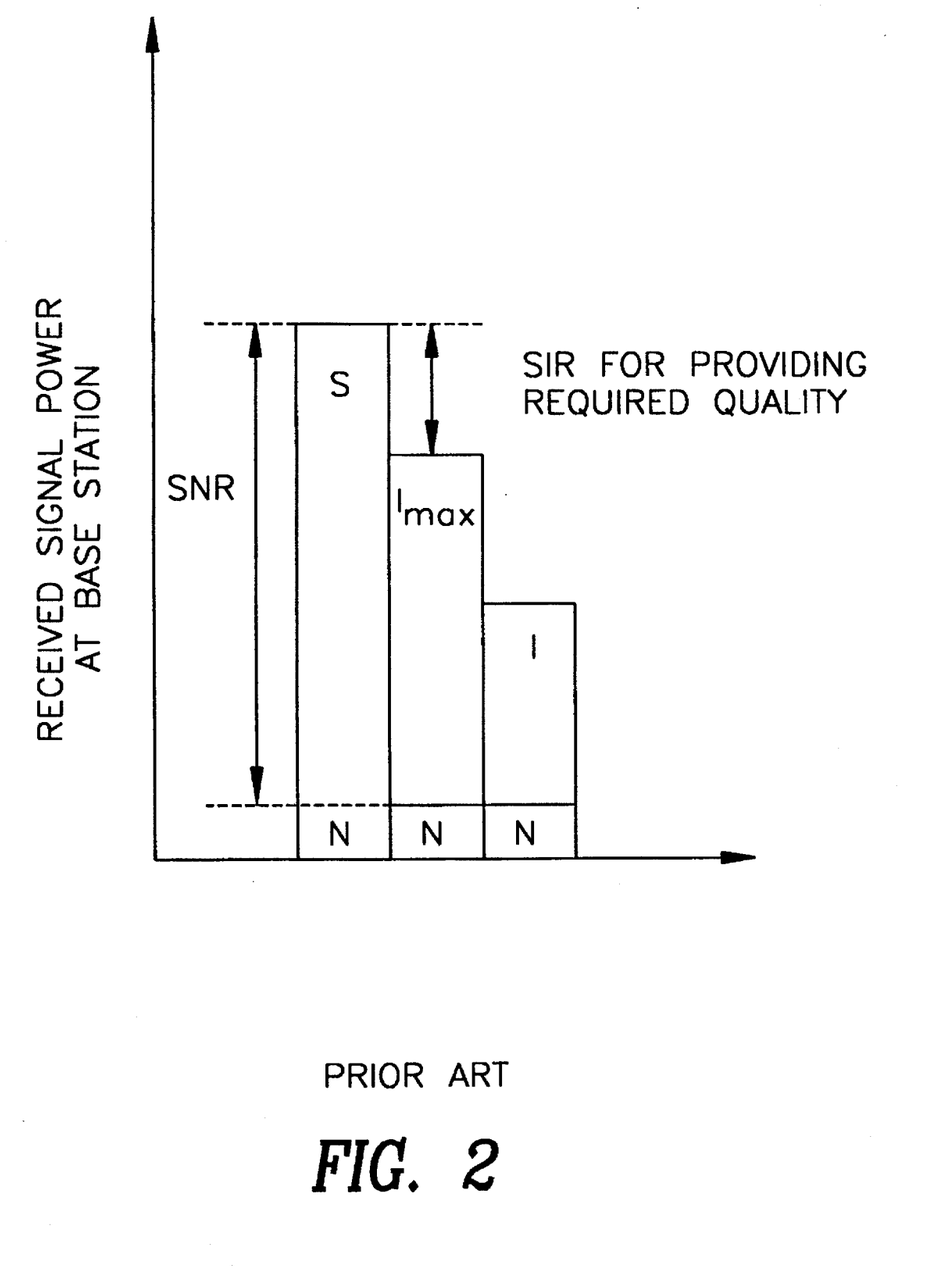
FIG. 2 is a diagram illustrating a conventional transmission power control method with reference to a thermal noise level.

FIG. 2 illustrates a method of determining transmission power of a mobile station with respect to a thermal noise level. In FIG. 2, the reference character S designates desired received signal power at a base station, I designates interference power at the base station, $I_{max}$ designates maximum allowable interference power at the base station, which interference power depends on the system, and SNR designates a ratio of the desired received signal power S to the thermal noise power N at the base station. The transmission power control of a mobile station at the base station is performed as follows:

(1) The base station has set in advance a desired received signal level needed to achieve a satisfactory received quality of a signal from a mobile station.

(2) The base station measures the actual received signal level of the signal transmitted from the mobile station.

(3) The base station decides whether the actual received signal level of the signal from the mobile station is greater or smaller than the desired received signal level.

(4) The base station inserts a transmission power control bit corresponding to the decision result periodically into a frame of a forward signal. The transmission power control bit commands an increase or a decrease of the transmission power of the mobile station.

This closed loop transmission power control makes it possible to carry out a high accuracy transmission power control whose error is within a few dB.

On the other hand, open loop transmission power control is performed as follows: First, the level of a signal transmitted from the base station is measured; and second, signal power transmitted from the mobile station to the base station is reduced when the received signal level at the mobile station is large, or vice versa.

Although the closed loop transmission power control is more accurate than the open loop transmission power control, the closed loop control involves a time delay. This is because the base station measures the received signal level from the mobile station, evaluates the transmission power of the mobile station of a few transmission power control intervals later, and then sets the transmission power of the mobile station using a forward transmission power control bit. Thus, proper transmission power control will be difficult owing to the time delay involved in the closed loop control when a sudden change in transmission characteristics occurs.

Furthermore, to absorb instantaneous fluctuations due to Rayleigh fading, the transmission power control bit must be inserted into frames at a rate higher than the Doppler frequency. For example, assuming that communications are carried out using carriers of 2 GHz band, and a mobile station is moving at 60–70 km/h, the Doppler frequency becomes about 200 Hz, and the received level will fluctuate at the interval corresponding to this frequency. Accordingly, the transmission power control bit must be inserted into frames at every few millisecond period. Considering the frame efficiency, the number of transmission power control bits per transmission power control must be limited to one or two. Hence, quick changes in the transmission power cannot be achieved by this number of bits.

On the other hand, since there are many high buildings in urban areas, the propagation path of a mobile station may suddenly transfers from a shadow of a high building to a line of sight area, or vice versa. In such cases, the received signal level at the base station can vary by more than 30 dB. As long as the transmission power control in the reverse direction operates normally as described above, the base station's received powers of the signals transmitted from respective mobile stations become constant, and hence, uniform receive quality can be obtained. However, when a mobile station suddenly moves out of the shadow of a building to a line of sight area, the base station's received power of the signal transmitted from the mobile station suddenly increases, and this induces large interference to signals transmitted from other mobile stations.

Figure 3:
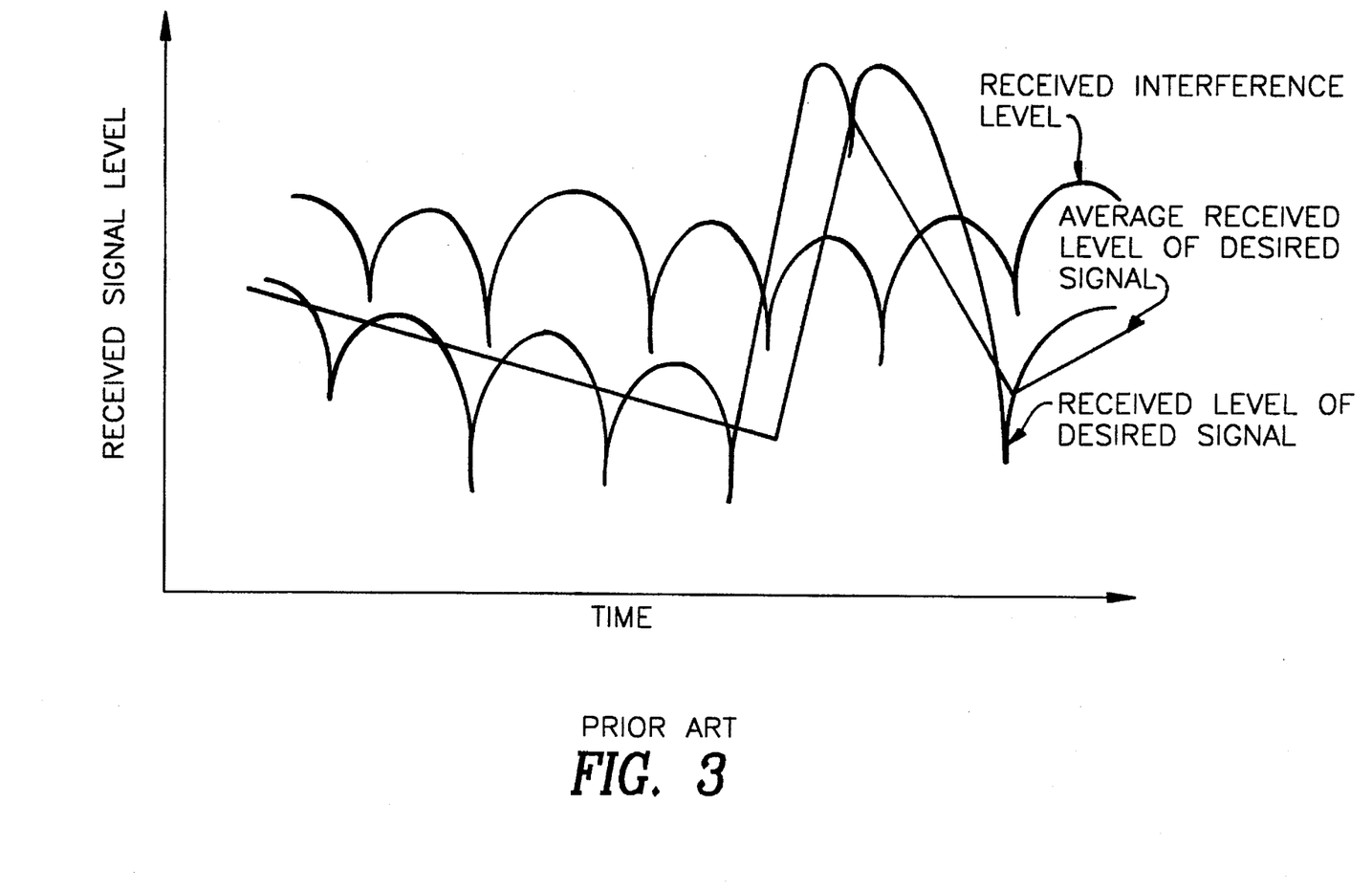
FIG. 3 is a diagram illustrating changes in received signal levels at a base station when a reverse link transmission power control is performed.

FIG. 3 illustrates an example of received signal level changes at the base station. In such cases, the closed loop transmission power control cannot quickly reduce the transmission power because the closed loop control involves some delay of a certain time constant. This presents a problem in that large interference to other users takes place.

As described above, the reverse transmission power control at a mobile station generally employs a closed loop transmission power control in the conventional CDMA system because high accuracy power control is required. The closed loop transmission power control, however, includes some delay of a considerable time constant involved in the feedback loop, and hence, it cannot achieve quick changes in the transmission power.

On the other hand, since there are many high buildings in urban areas, the propagation path of a mobile station may suddenly move from a shadow of a high building to a line of sight area, or vice versa. In such cases, the received signal level at the base station will vary by a large amount. In particular, when a mobile station suddenly moves out of a shadow of a building to a line of sight area, the base station's received power of the signal transmitted from the mobile station suddenly increases, and this presents a serious problem in that it provides large interference to signals transmitted from other mobile stations.

SUMMARY OF THE INVENTION

In view of this, a first object of the present invention is to provide a transmission power control method and a transmission power control apparatus using the same for a mobile station in a CDMA system, which primarily controls the transmission power of the mobile station at high accuracy by the closed loop control, and which can prevent the interference to other mobile stations by achieving, by using open loop control, a quick reduction in the transmission power of the mobile station in accordance with the state of neighboring buildings in the reverse transmission power control.

In a first aspect of the present invention, there is provided a transmission power control method for a CDMA (Code Division Multiple Access) system which controls transmission power of a mobile station on the basis of a transmission power control bit sent from a base station to the mobile station, the method comprising the steps of:

measuring, at the mobile station, average received power per transmission power control period of a signal sent from the base station;

detecting, at the mobile station, a power difference between the average received power of a current transmission power control period and that of one of previous transmission power control periods;

deciding, at the mobile station, whether the power difference exceeds a predetermined reference power difference;

setting, at the mobile station, transmission power of the mobile station in accordance with the power difference when the power difference exceeds the predetermined reference power difference, and in accordance with the transmission power control bit when the power difference is lower than the predetermined reference power difference.

The transmission power control method may further comprise the steps of:

calculating, at the base station, an SIR (Signal-to-Interference Ratio) of received power of a desired signal sent from the mobile station to a sum of interference power from other mobile stations and thermal noise power;

deciding whether the SIR is greater than a reference value predetermined for satisfying a predetermined transmission quality; and inserting the transmission power control bit periodically into a forward (from base station to mobile station) frame in accordance with a result of decision at the preceding step of deciding.

In a second aspect of the present invention, there is provided a transmission power control apparatus for a CDMA (Code Division Multiple Access) system which controls transmission power of a mobile station on the basis of a transmission power control bit sent from a base station to the mobile station, the apparatus comprising:

means for measuring, at the mobile station, average received power per transmission power control period of a signal sent from the base station;

means for detecting, at the mobile station, a power difference between the average received power of a current transmission power control period and that of one of previous transmission power control periods;

means for deciding, at the mobile station, whether the power difference exceeds a predetermined reference power difference;

means for setting, at the mobile station, transmission power of the mobile station in accordance with the power difference when the power difference exceeds the predetermined reference power difference, and in accordance with the transmission power control bit when the power difference is lower than the predetermined reference power difference.

The transmission power control apparatus may further comprise:

means for calculating, at the base station, an SIR (Signal-to-Interference Ratio) of received power of a desired signal sent from the mobile station to a sum of interference power from other mobile stations and thermal noise power;

means for deciding whether the SIR is greater than a reference value predetermined for satisfying a predetermined transmission quality; and means for inserting the transmission power control bit periodically into a forward (from base station to mobile station) frame in accordance with a result of decision at the preceding step of deciding.

According to the present invention, the transmission power control is performed by switching the closed loop control to the open loop control, or vice versa, in accordance with changes in the desired received signal level at the mobile station. More specifically, the present invention primarily controls the transmission power of a mobile station at high accuracy by a closed loop control, and drops the transmission power of the mobile station quickly when the received signal power at the mobile station increases by a large amount in accordance with the state of neighboring buildings, thereby implementing the reverse direction transmission power control which can prevent interference to other mobile stations.

The above and other objects, effects, features and advantages of the present invention will become more apparent from the following description of the embodiment thereof taken in conjunction with the accompanying drawings.

DETAILED DESCRIPTION OF PREFERRED EMBODIMENT

The invention will now be described with reference to the accompanying drawings.

Figure 4:
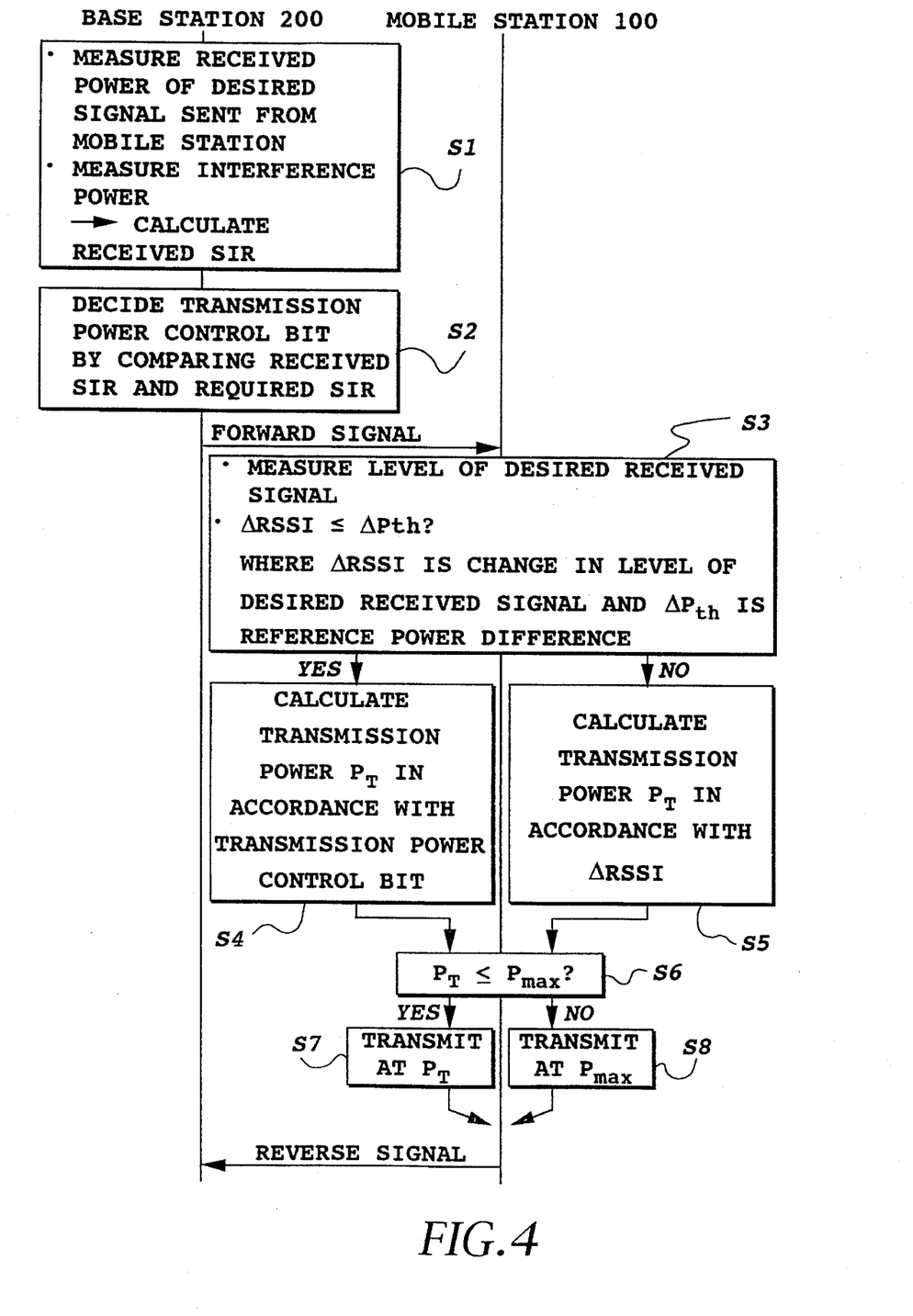
FIG. 4 is a flowchart illustrating a power control method in accordance with the present invention.

FIG. 4 is a flowchart showing a transmission power control in accordance with the present invention. A base station 200 calculates at step S1 an SIR (signal-to-interference ratio) S/(I+N) of received power S of a desired signal from a party mobile station 100 to the sum of interference power I from other mobile stations and thermal noise power N. Subsequently, the base station compares the received SIR with a predetermined reference SIR required for satisfying an intended transmission quality, and decides whether or not the received SIR is greater than the reference SIR. Then, the base station inserts a transmission power control bit periodically into information bits in a forward (from base station to mobile station) frame in accordance with the result of the decision (step S2).

Figure 5:
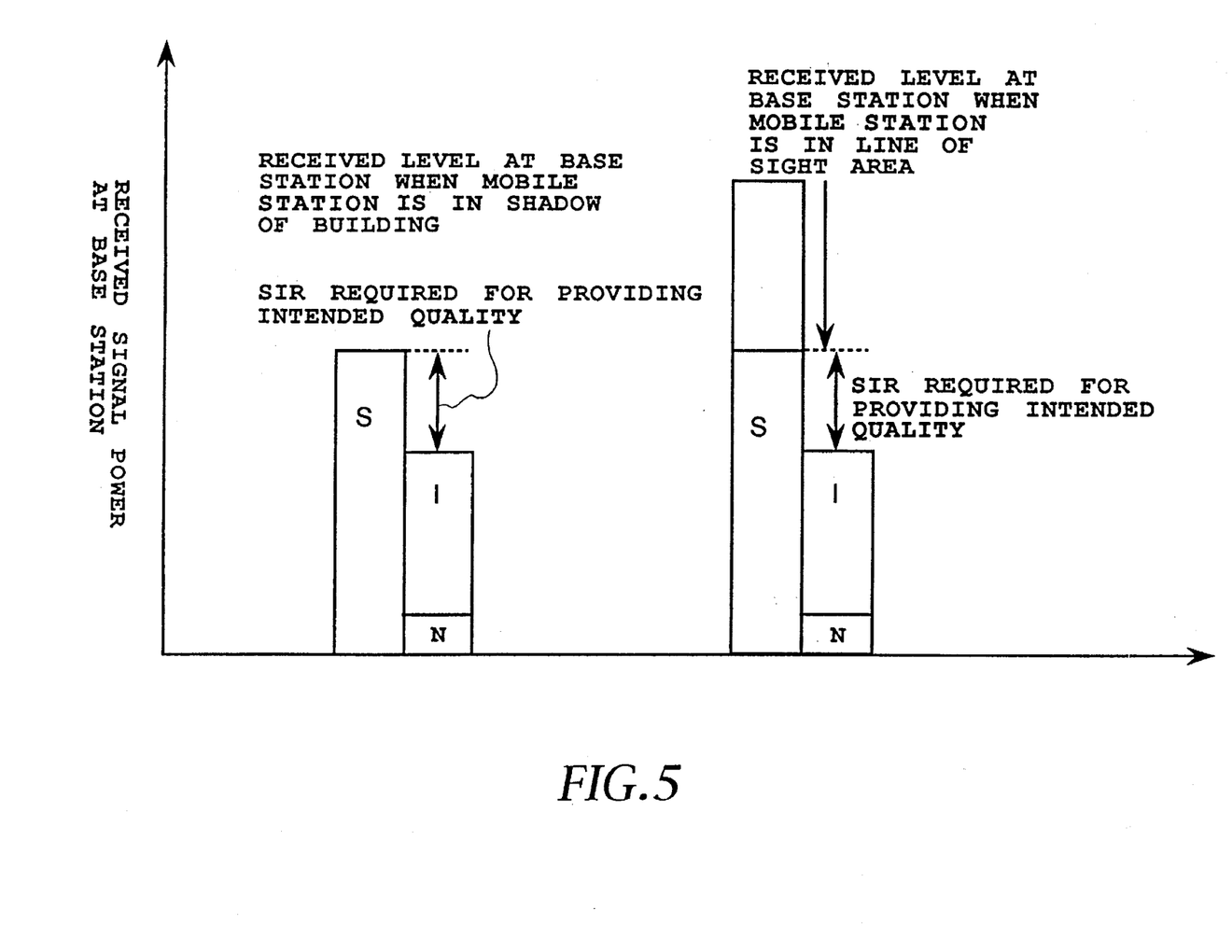
FIG. 5 is a diagram illustrating the operation of the power control method in accordance with the present invention.

FIG. 5 illustrates the operation principle of the transmission power control method at the mobile station in accordance with the present invention. In this figure, S denotes desired received signal power at the base station, I designates interference power at the base station, and SIR is a ratio of the desired received signal power S to the interference power I. The present invention time-divisionally employs the closed loop control and the open loop control in accordance with changes in the desired received signal power at the mobile station 100.

The mobile station 100 sequentially measures average received power per transmission power control period, of the desired signal transmitted from the base station 200. Thus, the mobile station 100 calculates the average received power of the desired signal in the present transmission power control period and that in one or more previous transmission power control period, and then calculates the difference $\Delta RSSI$ of the two. If the average power difference $\Delta RSSI$ is lower than a predetermined reference power difference $\Delta P_{th}$ (step S3), the mobile station calculates its transmission power $P_T$ in accordance with the transmission power control bit extracted from the forward frame at step S4. Thus, the transmission power of the mobile station is set by the closed loop transmission power control at step S4.

On the other hand, if the average power difference $\Delta RSSI$ exceeds the reference power difference $\Delta P_{th}$, the mobile station quickly decreases its transmission power on the assumption that the mobile station moves out of the shadow of a building to a line of sight area. Specifically, the mobile station calculates the transmission power $P_T$ at step S5 in accordance with the power difference $\Delta RSSI$ between the present transmission power control period and one of previous transmission power control periods.

This will be described in more detail referring to FIG. 5. As shown in FIG. 5, the desired received signal power S at the base station suddenly increases when the mobile station moves out of the shadow of a building to a line of sight area. This is because the mobile station is transmitting to the base station at the transmission power adjusted in the shadowed state, and hence, the received power at the base station increases to a much larger amount when the mobile station enters the line of sight area. In contrast, the interference power from other mobile stations will not change substantially. This results in an increase in interference to other mobile stations. To prevent such a problem, the present invention tries to correct the interference in a very short time using the open loop control through steps S5, S6 and S8.

At step S6, the mobile station tests to decide whether the transmission power $P_T$ calculated at steps S4 and S5 exceeds a predetermined maximum allowable transmission power $P_{max}$. If $P_T$ does not exceed $P_{max}$, the mobile station carries out the transmission at the transmission power $P_T$ at step S7, whereas if $P_T$ exceeds $P_{max}$, it performs the transmission at the maximum allowable transmission power $P_{max}$ at step S8.

The relation between the close loop control and the open loop control in the present invention will be described in more detail. When the change $\Delta RSSI$ in the desired received signal power of the mobile station is less than the reference power difference $\Delta P_t$, the mobile station performs a closed loop transmission power control as shown in FIG. 6.

Figure 6:
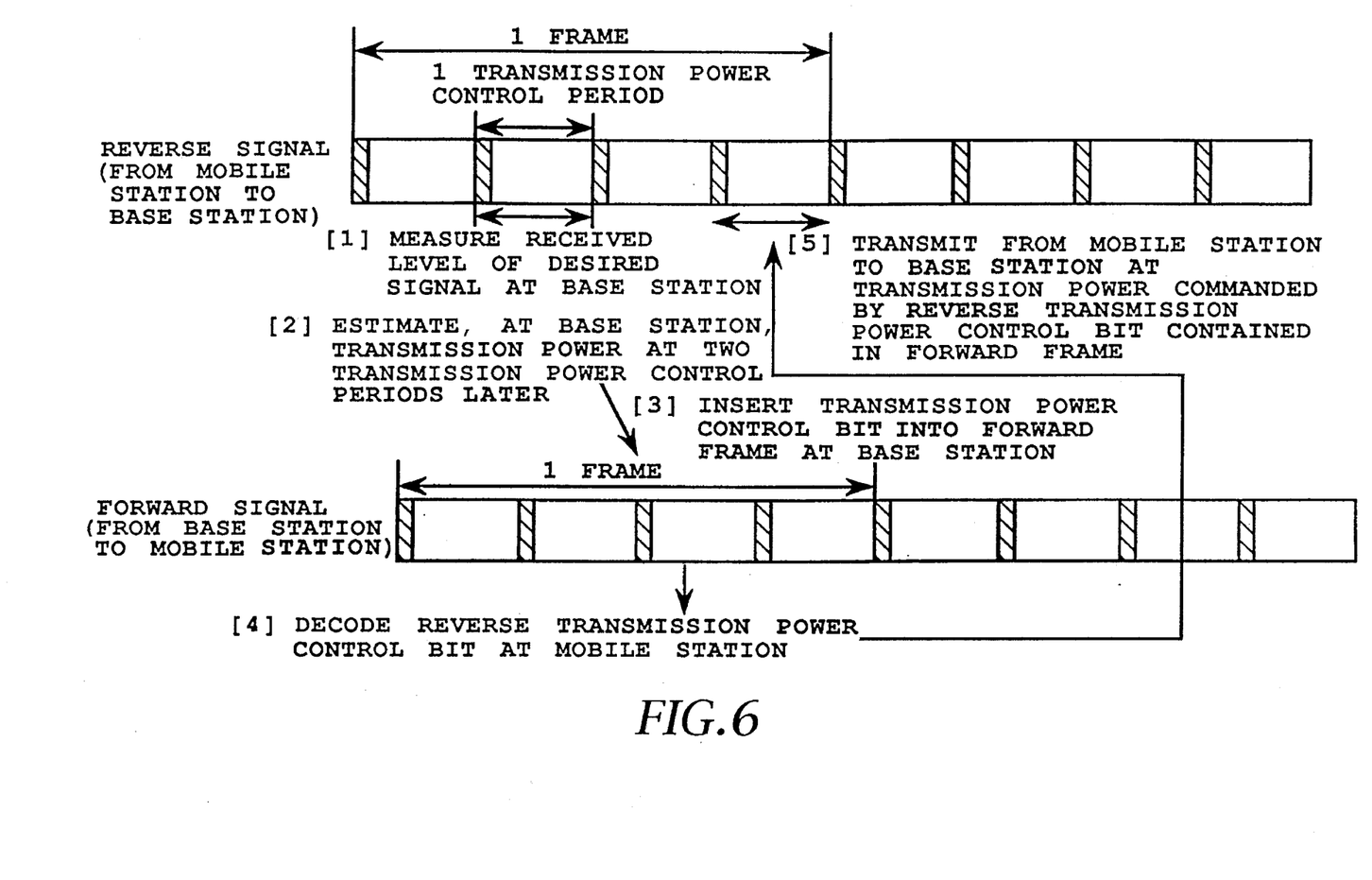
FIG. 6 is a diagram illustrating the principle of the closed loop transmission power control in accordance with the present invent ion.

In FIG. 6, the transmission power control is carried out as follows: (Numbers in brackets correspond to those of FIG. 6.)

[1] A base station measures a desired received power level, and calculates its SIR.

[2] The base station estimates a transmission power at two transmission power control periods later by comparing the measured SIR with a predetermined reference SIR.

[3] The base station generates a transmission power control bit which commands an increment or decrement of transmission power of a mobile station, and inserts it into a forward frame periodically. The insertion period is determined such that the power control can follow instantaneous fluctuations associated with the Doppler frequency.

[4] The mobile station decodes the reverse link transmission power control bit, which is included in the forward frame sent from the base station.

[5] The mobile station transmits a signal at the transmission power commanded by the reverse link transmission power control bit included in the forward frame.

The reference power difference $\Delta P_{th}$ with respect to the change $\Delta RSSI$ in the desired received signal power is set as follows: First, a maximum value of decrement in the transmission power of the mobile station, which the transmission power bit or bits can provide during one or two frames in the closed loop control is estimated. Second, a value greater than the maximum value is set as the reference power difference $\Delta P_{th}$, which is supposed to become about 30–50 dB in general.

Thus, the present invention can achieve high accuracy control because it primarily performs a closed loop transmission power control. Furthermore, since the closed loop control is switched to the open loop control that determines the transmission power $P_T$ in accordance with the change $\Delta RSSI$ in the desired received signal power of the mobile station when the received signal power of the mobile station suddenly increases owing to a propagation state surrounding the mobile station, the transmission power of the mobile station can be reduced in a very short time. Therefore, the interference to other communicators can be reduced.

Figures 7, 7A:
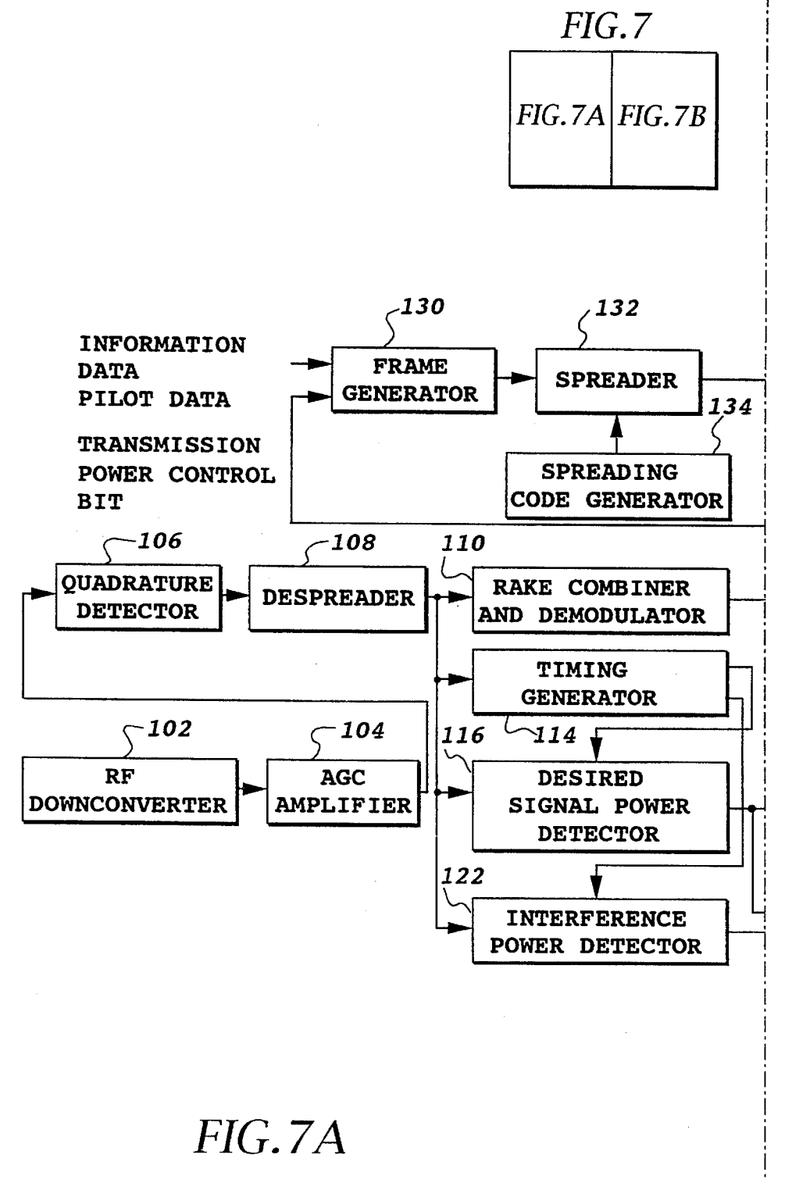
FIGS. 7A and 7B are block diagrams showing an embodiment of a mobile station of a CDMA system in accordance with the present invention.
Figure 7B:
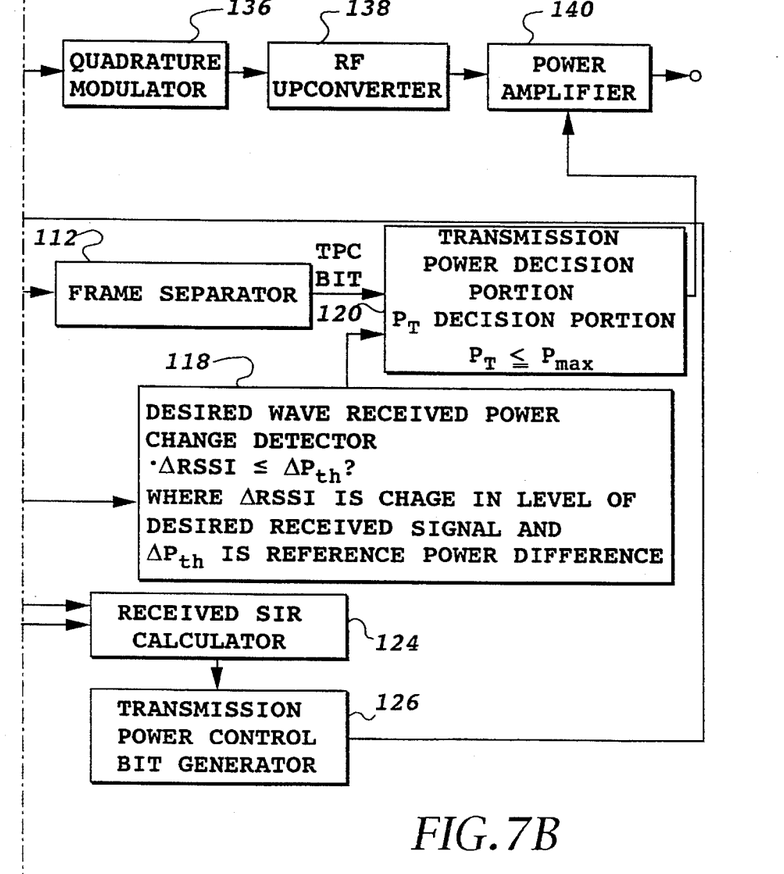

FIGS. 7A and 7B are block diagrams showing an embodiment of a CDMA mobile station 100 in accordance with the present invention. A base station 200 has a similar arrangement, but has no desired received power change detector 118.

The mobile station 100 is roughly divided into a receiver block 102–126, and a transmitter block 130–140.

First, the receiver block will be described. The receiver block includes an RE downconverter 102 for converting an RF (Radio Frequency) received signal to an IF (Intermediate Frequency) signal. A forward signal, which is transmitted from the base station 200 and received by the mobile station 100, passes through the RF (Radio Frequency) downconverter 102, an AGC (Automatic Gain Control) amplifier 104, and a quadrature detector 106, and is inputted to a despreader 108. The despreader 108 includes matched filters or a sliding correlator, and despreads the signal which has been spread by a PN (PseudoNoise) code. The output signal of the despreader 108 is supplied to a RAKE combiner and demodulator 110, a timing generator 114, a desired signal power detector 116, and an interference power detector 122.

The RAKE combiner and demodulator 110 performs demodulation of the signal, such as a reverse conversion of a signal which, for example, has undergone Walsh conversion, and combines individual chips of the signal by using the maximal-ratio combining. A frame separator 112 extracts a transmission power control bit from a symbol sequence of the forward signal thus combined. The timing generator 114 generates a timing signal for synchronization by detecting a pilot signal included in the forward signal, and feeds the timing signal to the desired signal power detector 116 and the interference power detector 122. The desired signal power detector 116 detects the power level of the intended received signal from the base station 200, and performs a part of the processings of the foregoing steps S1 and S3 of FIG. 4. The desired signal received level is sent to a desired signal received power change detector 118 and a received SIR calculator 124.

The desired signal received power change detector 118 carries out the calculation and decision of the foregoing step S3 of FIG. 4 on the basis of the desired signal received level. The result of the decision is fed to a transmission power decision portion 120. The transmission power decision portion 120 receives the decision result from the detector 118 and the transmission power control bit from the frame separator 112, performs the processings of steps S4–S8 of FIG. 4, and supplies a power amplifier 140 with a transmission power value obtained by the processings.

In connection with this, the base station 200 performs a closed loop power control as follows: First, a transmission power decision portion 120 of the base station 200 calculates transmission power $P_T$ based on a transmission power control bit supplied from a frame separator 112, and then outputs the upper limit power $P_{max}$ when $P_T$ exceeds $P_{max}$, and outputs $P_T$ when $P_T$ is lower than $P_{max}$.

In parallel with the above-described processings, the base station 200 performs steps S1 and S2. First, an interference power detector 122 of the base station 200 cooperates with a received SIR calculator 124 to perform the processing of step S1 of FIG. 4. The calculation result of the received SIR calculator 124 is sent to a control bit decision portion 126 of the base station 200 which carries out the processing of step S2 of FIG. 4. The transmission power control bit determined by the control bit decision portion 126 is fed to a frame generator 130 which inserts the transmission power control bit to a frame to be transmitted to the mobile station 100. Processings similar to steps S1 and S2 are also carried out at the mobile station 100.

Next, the transmitter block of the mobile station 100 will be described. The frame generator 130 receives the transmission power control bit, information data, pilot data, or the like, and generates a reverse frame (a frame sent from mobile station 100 to base station 200) as shown in FIG. 6. The frame is fed to a spreader 132 which spectrum spreads the input signal by using the PN code generated by a spreading code generator 134. The signal spread by the spreader 132 undergoes a quadrature modulation by a modulator 136, and is inputted to the power amplifier 140 through an RF-upconverter 138. The power amplifier 140 amplifies the input signal up to the transmission power $P_T$ or $P_{max}$ determined by the transmission power decision portion 120, and transmits it.

Although the transmission power is controlled by the power amplifier 140 in the RF section at the mobile station 100, it is controlled in the baseband using a current control at the base station 200. This is because the base station 200 combines a plurality of channels at the baseband, and amplifies them at the same time.

The present invention has been described in detail with respect to an embodiment, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A transmission power control method for a CDMA (Code Division Multiple Access) system which controls transmission power of a mobile station on the basis of a transmission power control bit sent from a base station to the mobile station, said method comprising the steps of:

measuring, at the mobile station, average received power per transmission power control period of a signal sent from the base station;

detecting, at the mobile station, a power difference between the average received power of a current transmission power control period and that of one of previous transmission power control periods;

deciding, at the mobile station, whether said power difference exceeds a predetermined reference power difference;

setting, at the mobile station, transmission power of the mobile station in accordance with said power difference when said power difference exceeds said predetermined reference power difference, and in accordance with the transmission power control bit when said power difference is lower than the predetermined reference power difference.

2. The transmission power control method as claimed in claim 1, further comprising the steps of:

calculating, at the base station, an SIR (Signal-to-Interference Ratio) of received power of a desired signal sent from the mobile station to a sum of interference power from other mobile stations and thermal noise power;

deciding whether said SIR is greater than a reference value predetermined for satisfying a predetermined transmission quality; and inserting said transmission power control bit periodically into a forward (from base station to mobile station) frame in accordance with a result of decision at the preceding step of deciding.

3. A transmission power control apparatus for a CDMA (Code Division Multiple Access) system which controls transmission power of a mobile station on the basis of a transmission power control bit sent from a base station to the mobile station, said apparatus comprising:

means for measuring, at the mobile station, average received power per transmission power control period of a signal sent from the base station;

means for detecting, at the mobile station, a power difference between the average received power of a current transmission power control period and that of one of previous transmission power control periods;

means for deciding, at the mobile station, whether said power difference exceeds a predetermined reference power difference;

means for setting, at the mobile station, transmission power of the mobile station in accordance with said power difference when said power difference exceeds said predetermined reference power difference, and in accordance with the transmission power control bit when said power difference is lower than the predetermined reference power difference.

4. The transmission power control apparatus as claimed in claim 3, further comprising:

means for calculating, at the base station, an SIR (Signal-to-Interference Ratio) of received power of a desired signal sent from the mobile station to a sum of interference power from other mobile stations and thermal noise power;

means for deciding whether said SIR is greater than a reference value predetermined for satisfying a predetermined transmission quality; and means for inserting said transmission power control bit periodically into a forward (from base station to mobile station) frame in accordance with a result of decision at the preceding step of deciding.

* * * * *